US006840457B2

(12) United States Patent
Park et al.

(10) Patent No.: US 6,840,457 B2
(45) Date of Patent: Jan. 11, 2005

(54) WET-PIPE SPRINKLER SYSTEM, METHOD OF SUPPLYING WATER AND DEALING WITH WATER LEAK IN THE SPRINKLER SYSTEM

(75) Inventors: Hyo-jung Park, Sungnam (KR); Sung-sik Yun, Suwon (KR); Kyong-gwan Lee, Suwon (KR); Seong-ock Hong, Kyungki-do (KR); Hyun-ku Kim, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 205 days.

(21) Appl. No.: 10/265,768

(22) Filed: Oct. 8, 2002

(65) Prior Publication Data

US 2003/0066903 A1 Apr. 10, 2003

(30) Foreign Application Priority Data

Oct. 9, 2001 (KR) ........................................ 2001-62153

(51) Int. Cl.[7] ................................................ A01G 27/00
(52) U.S. Cl. ............................ 239/69; 239/574; 169/16
(58) Field of Search .......................... 239/69, 104, 106, 239/110, 108, 109, 574, 578, 67; 169/13, 16, 43

(56) References Cited

U.S. PATENT DOCUMENTS 5,979,656 A * 11/1999 Northcott et al. ........... 206/564

* cited by examiner

*Primary Examiner*—Christopher Kim
(74) *Attorney, Agent, or Firm*—Lee & Sterba, P.C.

(57) ABSTRACT

A wet-pipe sprinkler system, method of supplying water to the system, and method of dealing with a leakage of the system are provided, wherein the wet-pipe sprinkler system includes a sprinkler head; a plurality of interconnected pipes for supplying water to the sprinkler head; at least one water supply connected to one end of the pipes; an electric main valve for controlling inflow of water to the pipes; an electric drain valve to drain water from the pipes; a first electrical control circuit in a central control studio which outputs a drain valve opening signal to the electric drain valve and a main valve closing signal to the electric main valve when a leakage is detected, thereby blocking the water from entering the pipes and draining the water from the pipes. Accordingly, a leak may be dealt with promptly, thereby minimizing damage caused by the leakage.

11 Claims, 7 Drawing Sheets

WET-PIPE SPRINKLER SYSTEM, METHOD OF SUPPLYING WATER AND DEALING WITH WATER LEAK IN THE SPRINKLER SYSTEM

BACKGROUND OF THE INVENTION

1. Field of the Invention

The present invention relates to a sprinkler system. More particularly, the present invention relates to a wet-pipe sprinkler system, a method of supplying water and dealing with water leak in the sprinkler system.

2. Description of the Related Art

A sprinkler system is an automatic fire-fighting system installed in the ceiling of a building or a structure. The system includes a sprinkler head that operates according to ambient thermal conditions, a series of interconnected pipes through which water is supplied to the sprinkler head, and at least one water supply. In general, there are two types of sprinkler systems: a wet-pipe sprinkler system and a dry-pipe sprinkler system. In a wet-pipe sprinkler system, a sprinkler head is filled with water. In a dry-pipe sprinkler system, the pipes are filled with air. The present invention relates to a wet-pipe sprinkler system.

A wet-pipe sprinkler system typically includes a main pipe through which water is supplied to a sprinkler head from a water supply and an auxiliary pipe on which the sprinkler head is installed. A main valve, which controls the overall inflow of the water from the water supply to the sprinkler system, is installed in the main pipe. The sprinkler head includes a heat fusible cap that tightly shuts an orifice during normal situations (i.e., no fire present), but automatically breaks to pieces and detaches from the sprinkler head during a fire. In the wet-pipe sprinkler system, both the auxiliary pipe and the main pipe are filled with water under a predetermined pressure, e.g., at a pressure of 6 kgf/cm$^2$. Therefore, in order to extinguish a fire, water can be rapidly discharged from the orifice when the heat fusible cap comes off the sprinkler head and the sprinkler head operates.

However, there are some problems associated with a conventional wet-pipe sprinkler system. First, a conventional wet-pipe sprinkler system is vulnerable to a physical phenomenon referred to as "water hammering" during the filling of a pipe with water. Water hammering is due to a rapid change in pressure of the water contained in a pipe caused by a sudden change in kinetic energy. The rapid change in pressure directly affects a pipe, thus generating a vibration and impulse noise therein. In a worst-case scenario, flooding of neighboring areas is caused by damage to a pipe. Therefore, it is important to prevent water hammering from occurring during the filling of a pipe with water. Water hammering frequently occurs when the main valve is opened to fill a pipe with water because the pressurized water from the water supply suddenly enters the pipe. For this reason, in the past, the sprinkler system was filled with water only by a water-filling pipe connected to the main pipe with the main valve closed, and the main valve was opened after the filling. In the above method, a pipe having a smaller diameter than the main pipe is used as a water-filling pipe so that water does not flow into the pipe too rapidly, thereby preventing water hammering. However, since the opening and shutting of the main valve is manipulated by a person, e.g., a system manager, water hammering may occur in a case where the main valve is mistakenly opened by the system manager before the sprinkler system is completely filled.

Additionally, it is inconvenient to monitor a leak in the pipes or sprinkler head and to stop the leak in a conventional wet-pipe sprinkler system. For instance, when the system operates due to malfunction or breakage of the system, water pressurized in the sprinkler head or pipes floods neighboring areas. Damage may be enormous when such an accident occurs in a clean room where semiconductor devices are manufactured, due to, for example, immersion of expensive tools for manufacturing semiconductor devices. In such a case, the water supply must be blocked by shutting the main valve immediately and rapidly draining water from a pipe to the location of the fire. However, in the conventional wet-pipe sprinkler system, valves are manually opened and closed by a person, such as a system manager, and thus the process of blocking water supply and draining water cannot be done immediately. Therefore, it is not possible to take quick measures when a pipe or a sprinkler head is leaking, thereby resulting in water damage.

SUMMARY OF THE INVENTION

In an effort to solve the above problems, it is a feature of an embodiment of the present invention to provide a wet-pipe sprinkler system capable of enacting rapid procedures when a pipe or a sprinkler head is leaking.

It is another feature of an embodiment of the present invention to provide a wet-pipe sprinkler system in which water hammering is minimized during the filling of a pipe with water.

It is still another feature of an embodiment of the present invention to provide a method of filling a wet-pipe sprinkler system with water while minimizing the occurrence of water hammering.

It is still another feature of an embodiment of the present invention to provide a method of minimizing damage due to the leakage of a pipe or a sprinkler head of a wet-pipe sprinkler system.

To provide one feature of an embodiment of the present invention, there is provided a wet-pipe sprinkler system including a sprinkler head; a plurality of interconnected pipes having a first end and a second end, the plurality of interconnected pipes for supplying water to the sprinkler head; at least one water supply connected to the first end of the plurality of interconnected pipes; an electric main valve for controlling an inflow of water from the water supply to the plurality of interconnected pipes; an electric drain valve connected to the second end of the plurality of interconnected pipes for draining the water from the plurality of interconnected pipes; a central control studio including a first electrical control circuit, the first electrical control circuit for outputting a drain valve opening signal to the electric drain valve, which opens the electric drain valve, and for outputting a first main valve closing signal to the electric main valve, which closes the main valve, thereby blocking water from entering the plurality of interconnected pipes and draining the water contained in the plurality of interconnected pipes, and wherein the plurality of interconnected pipes include a main pipe having a first end and a second end, the first end connected directly to the at least one water supply, the main pipe including a water flow detector and an auxiliary valve, a water-filling pipe having a first end and a second end, both of which are connected to the main pipe, the water-filling pipe including an inlet valve and an outlet valve, and an auxiliary pipe having a first end and a second end, the first end connected to the second end of the main pipe, the auxiliary pipe including the sprinkler head, wherein the electric main valve is connected to the main pipe upstream of the water flow detector, and the electric drain valve is connected to the second end of the auxiliary pipe, and the first end of the water-filling pipe is connected upstream of the electric main valve and the second end is connected downstream from the auxiliary valve.

Preferably, the system further includes a pressure switch for measuring a pressure in the auxiliary pipe and transmitting a signal indicating whether the pressure is at a normal level; and a control panel including a main valve control unit that outputs a second main valve closing signal to the electric main valve, which closes the electric main valve when the pressure switch transmits a signal indicating that the pressure in the auxiliary pipe is not at the normal level, so that the electric main valve is not able to be opened. Here, the main valve control unit may include means for canceling the output of the second main valve closing signal to the electric main valve. Preferably, the control panel further includes a state-indicative unit for indicating an open or closed state of all valves installed in the plurality of interconnected pipes, and for indicating whether the pressure of the auxiliary pipe is at a normal level based on a signal generated by the pressure switch.

Preferably, the water-filling pipe further includes an electric intermediate valve between the inlet valve and the outlet valve, and the control panel further includes a switch that is manipulated to transmit a starting signal for opening the electric intermediate valve when the pipes or the sprinkler is supplied with water, and a timer that counts a predetermined time and transmits a time delay signal in response to the starting signal. Preferably, the control panel further includes a state-indicative unit for indicating an open or closed state of all valves installed in the plurality of interconnected pipes and for indicating whether the pressure in the auxiliary pipe is at a normal level based on a signal generated by the pressure switch.

The sprinkler head may be installed in a clean room in which semiconductor devices are manufactured and may further include a controller, which is placed in a passage of the clean room, to output a drain valve opening signal to the electric drain valve and a main valve closing signal to the electric main valve.

In order to provide another feature of an embodiment of the present invention, a method of supplying water to the plurality of interconnected pipes in the wet-pipe sprinkler system according to an embodiment of the present invention includes verifying that the electric main valve and the inlet valve are closed, verifying that the auxiliary valve and the outlet valve are open, opening the inlet valve to supply water to the auxiliary pipe, checking the pressure in the auxiliary pipe, and opening the electric main valve, if the pressure in the auxiliary pipe is at a normal level.

In order to provide another feature of an embodiment of the present invention, a method of supplying water to the plurality of interconnected pipes in the wet-pipe sprinkler system according to another embodiment of the present invention includes verifying that the electric main valve and the electric intermediate valve are closed, verifying that the auxiliary valve, the inlet valve, and the outlet valve are open, manipulating the switch to open the electric intermediate valve to supply water to the auxiliary pipe, receiving the time delay signal and checking the pressure in the auxiliary pipe, and opening the electric main valve, if the pressure in the auxiliary pipe is at a normal level.

Another feature of an embodiment of the present invention is provided by a method of dealing with a leakage in the wet-pipe sprinkler system according to an embodiment of the present invention including detecting the leakage, reporting the leakage to the central control studio when the leakage is detected and outputting the drain valve opening signal to remotely open the electric drain valve and the main valve closing signal to remotely close the electric main valve via the first electrical control circuit in the central control studio.

Another feature of an embodiment of the present invention is provided by a method of dealing with a leakage in the wet-pipe sprinkler system according to another embodiment of the present invention including manipulating the controller to output the drain valve opening signal to open the electric drain valve and the first main valve closing signal to close the electric main valve when the leakage is discovered.

According to the present invention, it is possible to take rapid actions when a pipe or a sprinkler head is leaking, thus minimizing damage due to water leakage. Further, it is possible to fill the pipes with water such that the occurrence of water hammering is minimized.

BRIEF DESCRIPTION OF THE DRAWINGS

The above and other features and advantages of the present invention will become more apparent upon review of a detailed description of preferred embodiments thereof with reference to the attached drawings in which.

DETAILED DESCRIPTION OF THE INVENTION

Figure 1:
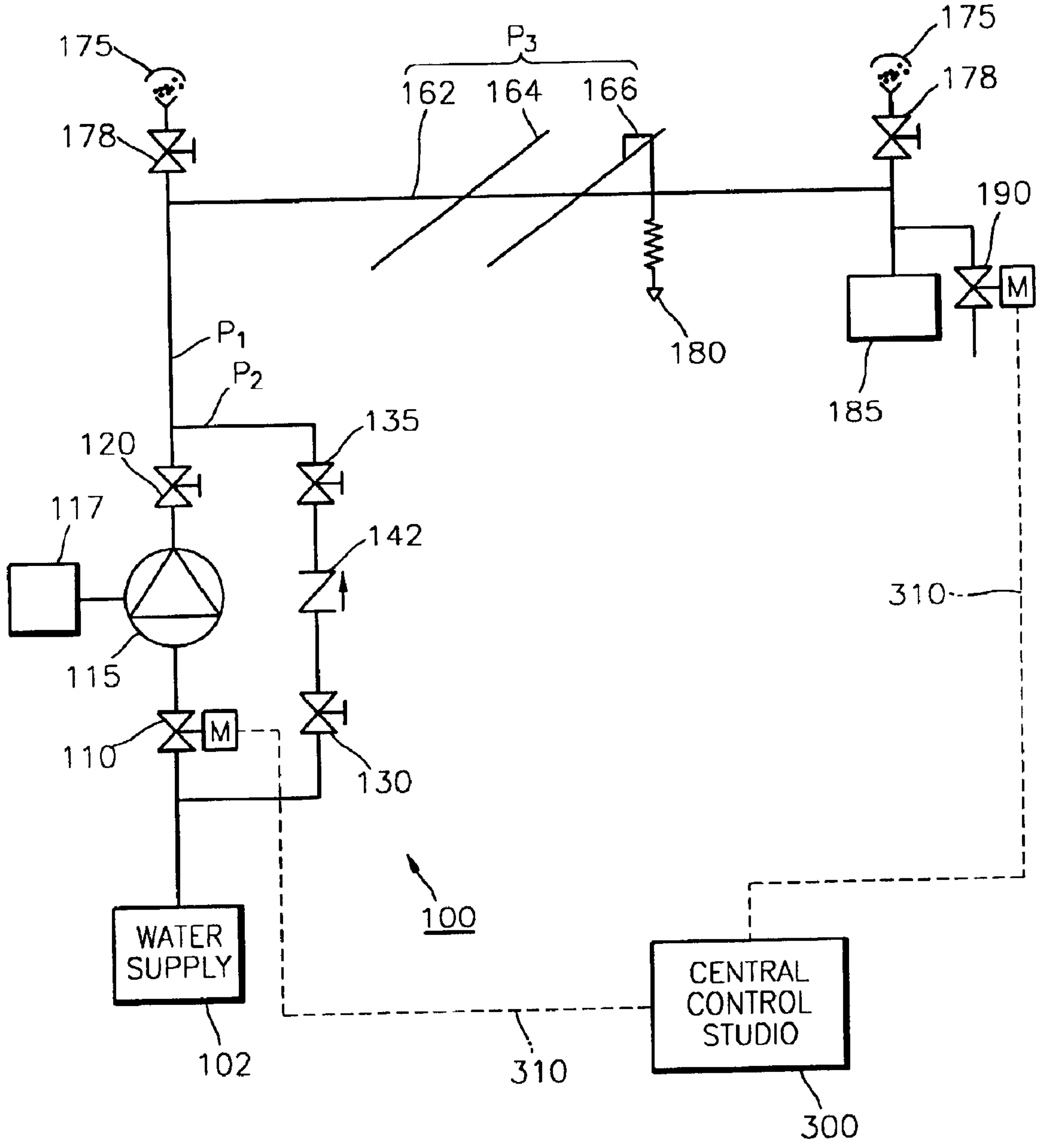
FIG. 1 illustrates a view of a wet-pipe sprinkler system according to a first embodiment of the present invention.

Korean Patent Application No. 2001-62153, entitled "Wet-Pipe Sprinkler System, Method of Supplying Water and Dealing With Water Leak in the Sprinkler System," filed on Oct. 9, 2001, is incorporated by reference herein in its entirety.

The present invention will now be described more fully with reference to the accompanying drawings, in which preferred embodiments of the invention are shown. This invention may, however, be embodied in many different forms and should not be construed as being limited to the embodiments set forth herein. Rather, these embodiments are provided so that this disclosure will be thorough and complete, and will fully convey the concept of the invention to those skilled in the art. In the drawings, the shapes of constitutional elements are exaggerated for clarity. Like reference numerals in different drawings represent the like elements and thus their description will be omitted.

First Embodiment

FIG. 1 illustrates a view of a wet-pipe sprinkler system 100 (hereinafter, 'system 100') according to a first embodiment of the present invention. Referring to FIG. 1, the system 100 includes a sprinkler head 180, interconnected pipes $P_1$, $P_2$, $P_3$ that supply water to the sprinkler head 180, and a water supply 102 connected to one end of the pipe $P_1$.

The structure of the water supply of a wet-pipe sprinkler system may vary according to the shape of a housing or structure, in which the system is provided. The system 100, however, adopts as an exemplary water supply 102 a water tank that is supplied with water by a fire pump and that delivers the water supplied to the other components. Further, an auxiliary tank such as an elevated tank may be further included as a supplementary water source. The fire pump may be used with a pump having a discharge capacity such that water is simultaneously discharged from eight to forty sprinkler heads at 80 liters/minute.

Water contained in the water supply 102 is supplied to a main pipe $P_1$ or a water-filling pipe $P_2$ The water-filling pipe $P_2$ has two ends, both of which are connected to the main pipe $P_1$. In addition, an auxiliary pipe $P_3$ including the sprinkler head 180 is connected to the main pipe $P_1$. A pipe having a large diameter is chosen as the main pipe $P_1$ according to the discharge rate of a fire pump. For example, a 60–250 mm-wide pipe may be used. The diameter of the water-filling pipe $P_2$ must be smaller than that of the main pipe $P_1$, e.g., a 40 mm-wide pipe, so that the flow of water into the auxiliary pipe $P_3$ occurs slowly enough to minimize water hammering. If the water flows into the auxiliary pipe $P_3$ too rapidly, water hammering will occur.

The main pipe $P_1$ is a riser pipe that is installed perpendicular to the ground. An electric main valve 110, a water flow detector 115, and an auxiliary valve 120 are installed on the main pipe $P_1$. The electric main valve 110 controls the overall inflow of water into the pipes $P_1$, $P_2$, $P_3$ from the water supply 102. Unlike in conventional wet-pipe sprinkler systems, in the first embodiment of the present invention, the main valve 110 is an electric valve. A valve, which is usually called an 'alarm check valve,' is selected as the water flow detector 115 as in conventional wet-pipe sprinkler systems, and detects if the sprinkler head 180 is open. In other words, when the sprinkler head 180 is open and water contained therein is sprayed at a fire, water in the auxiliary pipe $P_3$ flows to the sprinkler head 180, and water in the main pipe $P_1$ also flows to the sprinkler head 180. As a result, the water flow detector 115 operates. When the pressure in the auxiliary pipe $P_3$ decreases, a clapper in the water flow detector 115 is opened due to the water pressure in the main pipe $P_1$, thus allowing water to flow into the auxiliary pipe $P_3$. The water flow detector 115 may further include a pressure switch (not shown) that detects the pressure in the main pipe $P_1$ and also a test connection pipe 117 including a manual valve used to check periodically if the water flow detector 115 operates normally. The auxiliary valve 120, which is opened and closed by manipulating a handle thereof, is normally open.

The water-filling pipe $P_2$ is a pipe used for supplying water to the auxiliary pipe $P_3$ and has two ends that are connected to the main pipe $P_1$ below, i.e., upstream of, the electric main valve 110 and above, i.e., downstream of, the auxiliary valve 120. Also, an inlet valve 130 and an outlet valve 135, which are manual valves, are installed on the water-filling pipe $P_2$. A check valve 142 may be further installed between the inlet valve 130 and the outlet valve 135. The check valve 142 is a valve that enables water to flow in one direction, thereby preventing back flow, and may be a lift check valve or a swing check valve.

In the first embodiment of the present invention, the auxiliary pipe $P_3$ includes: a lateral pipe 162, which is connected perpendicularly to the main pipe $P_1$; a first branch pipe 164 branching away from the lateral pipe 162; and a second branch pipe 166 which branches out upwardly and away from the first branch pipe 164 and a portion of which is bent downward. Here, the number of the first and second branch pipes 164 and 166 may be increased to a desired number. The sprinkler head 180 is installed at one end of the second branch pipe 166. Unlike a lower pipe adopted in a sprinkler system, the second branch pipe 166 is installed to diverge upwardly with a portion bent downward to prevent sediment from accumulating in the sprinkler head 180. Although FIG. 1 shows that the second branch pipe 166 branches out from the first branch pipe 164, which branches from the lateral pipe 162, pipes may be set to branch out directly from the main pipe $P_1$ or the first branch pipe 164 by a predetermined number, as it demands, in the respective sprinkler system. Diameters of the lateral pipe 162, the first branch pipe 164 and the second branch pipe 166, which constitute the auxiliary pipe $P_3$, are not always required to be larger than the diameter of the main pipe $P_1$, but the diameter, material and thickness of a pipe must be considered so that a pipe can operate for a sufficient period of time under high pressure. For example, it is possible to select a 150 mm-wide pipe, a 65 mm-wide pipe, and a 25 mm-wide pipe as the lateral pipe 162, the first branch pipe 164, and the second branch pipe 166, respectively.

An air vent 175 may be included in the auxiliary pipe $P_3$ to alleviate any impact of water pressure applied to the auxiliary pipe $P_3$ when a pipe is supplied with water. Further, a manual valve 178, which is normally open, may be installed at the bottom of the air vent 175. Referring to FIG. 1, an air vent 175 and one manual valve 178 are installed on the auxiliary pipe $P_3$ as a pair, but the numbers thereof may be increased or decreased as necessary.

A test box 185 including a manual valve may be further installed at one end of the auxiliary pipe $P_3$. During normal conditions, the manual valve in the test box 185 is closed. The test box 185 is used to drain stagnant water from the auxiliary pipe $P_3$ during periodical checking of the system 100. Opening the manual valve of the test box 185 results in draining water, thereby removing any sediment present. Also, an electric drain valve 190 that drains water contained in the pipes $P_1$, $P_2$, $P_3$ is further installed at an end of the auxiliary pipe $P_3$.

Additionally, in the system 100, a first electrical control circuit 310 is included to allow a central control studio 300 to output a drain valve opening signal to the electric drain valve 190, which opens the electric drain valve 190, and a main valve closing signal to the electric main valve 110, which closes the electric main valve 110. In the event that the pipes $P_1$, $P_2$, $P_3$ or the sprinkler head 180 is leaking, the electric main valve 110 is remotely controlled to be closed via the first electrical control circuit 310, so that water can immediately be prevented from entering the pipes $P_1$, $P_2$, $P_3$. Further, water contained in the pipes $P_1$, $P_2$, $P_3$ may be rapidly released by opening the electric drain valve 190.

A conventional wet-pipe sprinkler system includes a main manual valve but does not include the electric drain valve 190 according to the present invention. Accordingly, when a leak occurs in a conventional system, in order to block the supply of water to the pipes, the main manual valve must be manipulated, and in order to release water from the pipes, the manual valve of the test box 185 must be manipulated. In other words, all valves of the system are manually manipulated by a system manager and thus, it is virtually impossible to deal with the leak rapidly.

In contrast, according to the first embodiment of the present invention, it is possible to deal with any leakage of the pipes $P_1$, $P_2$, $P_3$ or the sprinkler head 180 quickly, thereby minimizing damage due to the submergence or wetting of surroundings.

Figure 6:
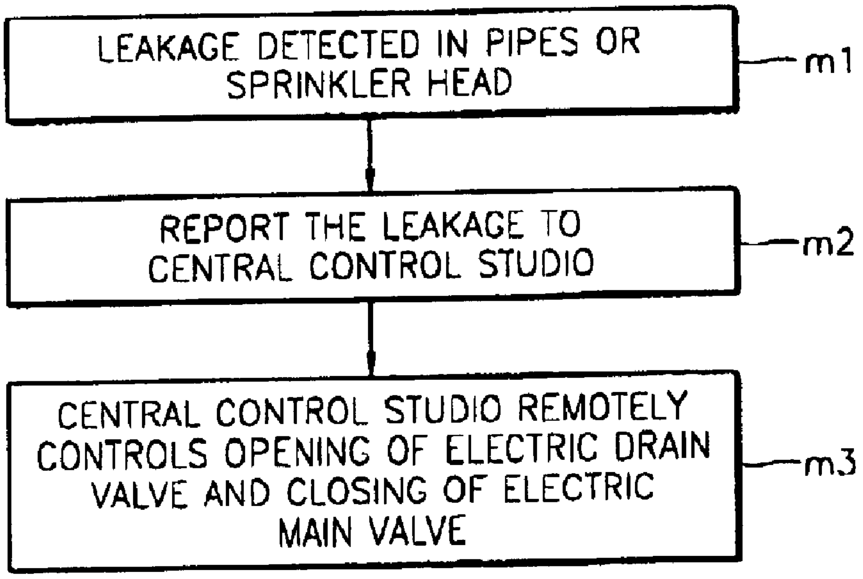
FIG. 6 is a flow chart of a method of dealing with leakage in a wet-pipe sprinkler system according to the various embodiments of the present invention.

A method of dealing with a leakage of the system 100 will now be described with reference to FIGS. 1 and 6.

When a system manager or the like becomes aware of a leakage in the pipes $P_1$, $P_2$, $P_3$, or the sprinkler head 180 (step m1), he or she reports this fact to a central control studio 300, which may located at a remote location (step m2). When the central control studio 300 receives the report, it transmits a drain valve opening signal to the electric drain valve 190, which opens the electric drain valve 190, and a main valve closing signal to the electric main valve 110, which closes the electric main valve 110. Thus, the central control studio 300 remotely controls the opening of the electric drain valve 190 and the closing of the electric main valve 110 (step m3).

According to the first embodiment of the present invention, it is possible to immediately open the electric drain valve 190 remotely to allow immediate drainage of the water from the pipes $P_1$, $P_2$, $P_3$ even if the pipes $P_1$, $P_2$, $P_3$ or the sprinkler head 180 is leaking. Further, it is possible to immediately block any additional supply of water from entering the pipes $P_1$, $P_2$, $P_3$ by rapidly closing the electric main valve 110 remotely, thereby minimizing an amount of water leaked from the pipes $P_1$, $P_2$, $P_3$ or the sprinkler head 180.

Figure 7:
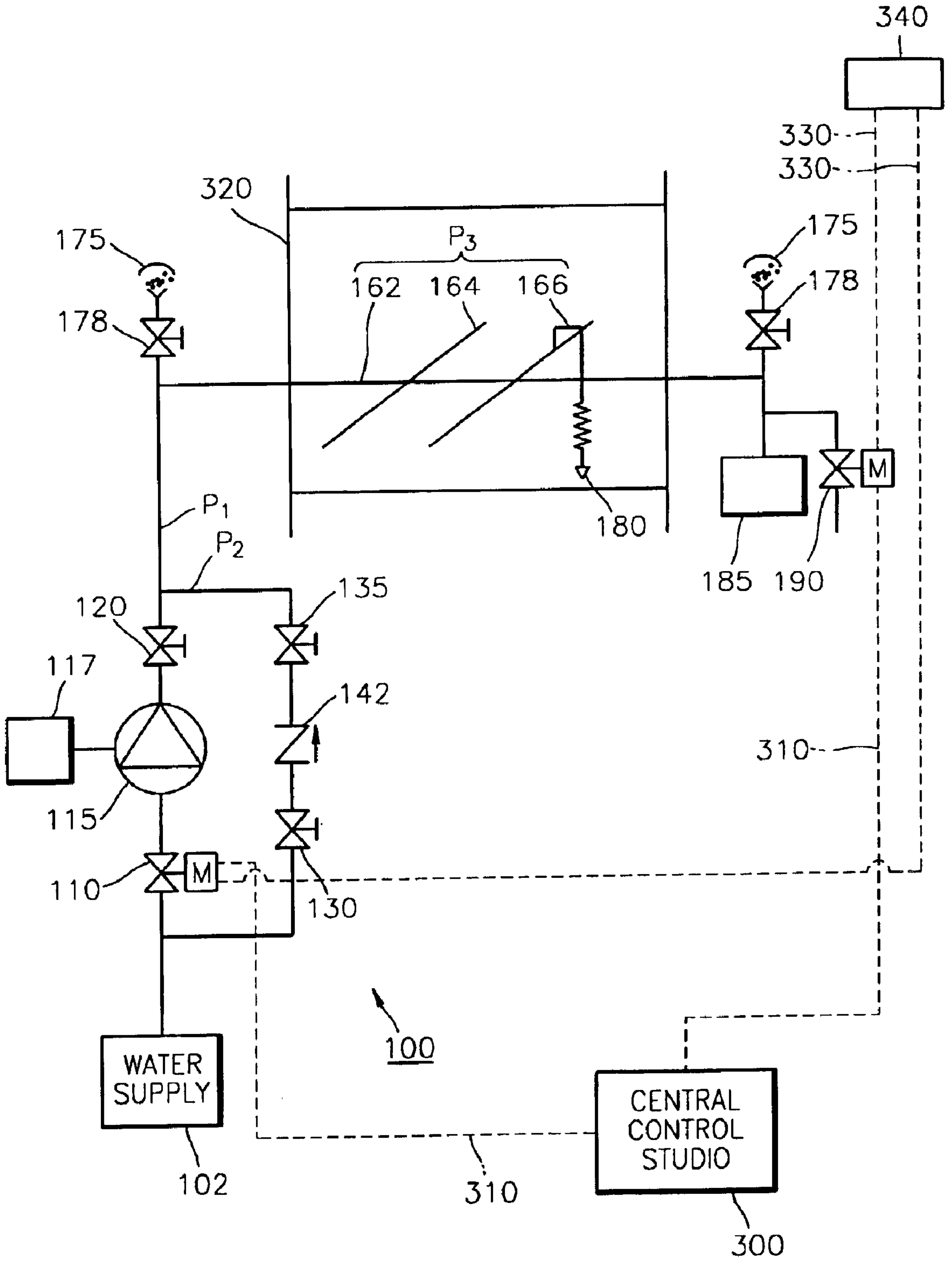
FIG. 7 illustrates a diagram of a modified wet-pipe sprinkler system according to the first embodiment.

Meanwhile, FIG. 7 shows a modified example of the wet-pipe sprinkler system 100 according to the first embodiment of the present invention that may be installed in a clean room 320 where semiconductor devices are manufactured.

Referring to FIG. 7, a controller 340 is further installed at a passage of the clean room 320 so that the drain valve opening signal and the main valve closing signal may be output to the electric drain valve 190 and the electric main valve 110, respectively, via a second electrical control circuit 330. Therefore, when a system manager detects a leakage in the pipes $P_1$, $P_2$, $P_3$ or the sprinkler head 180 to be leaking, he or she can deal with the leakage as described with reference to FIG. 6 or as later explained with reference to FIG. 8.

Figure 8:
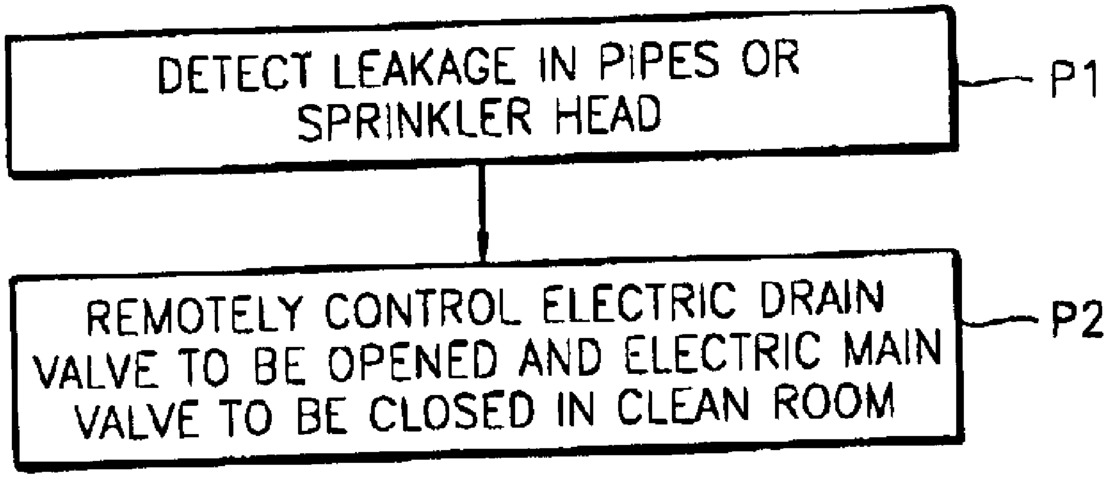
FIG. 8 is a flowchart illustrating a method of dealing with leakage of the wet-pipe sprinkler system shown in FIG. 7.

Referring to FIG. 8, if a system manager detects a leakage of the pipes $P_1$, $P_2$, $P_3$ or the sprinkler head 180 (step p1), he or she moves from a point of the leak to a passage of the clean room 320. Then, he or she manipulates a switch of the controller 340 to transmit a drain valve opening signal to the electric drain valve 190, which opens the electric drain valve 190, and a main valve closing signal to the electric main valve 110, which closes the electric main valve 110. As a result, the electric drain valve 190 and the electric main valve 110 may be opened and closed, respectively, remotely (step p2).

In conclusion, a system manager is able to deal with the leakage of the pipes $P_1$, $P_2$, $P_3$ or the sprinkler head 180 by manipulating the controller 340 to open the electric drain valve 190 and close the electric main valve 110. Alternatively, the system manager may report the leak to the central control studio 300, which may be at a remote location, so that the central control studio 300 may remotely control the electric drain valve 190 to be opened and the electric main valve 110 to be closed.

Second Embodiment

Figure 2:
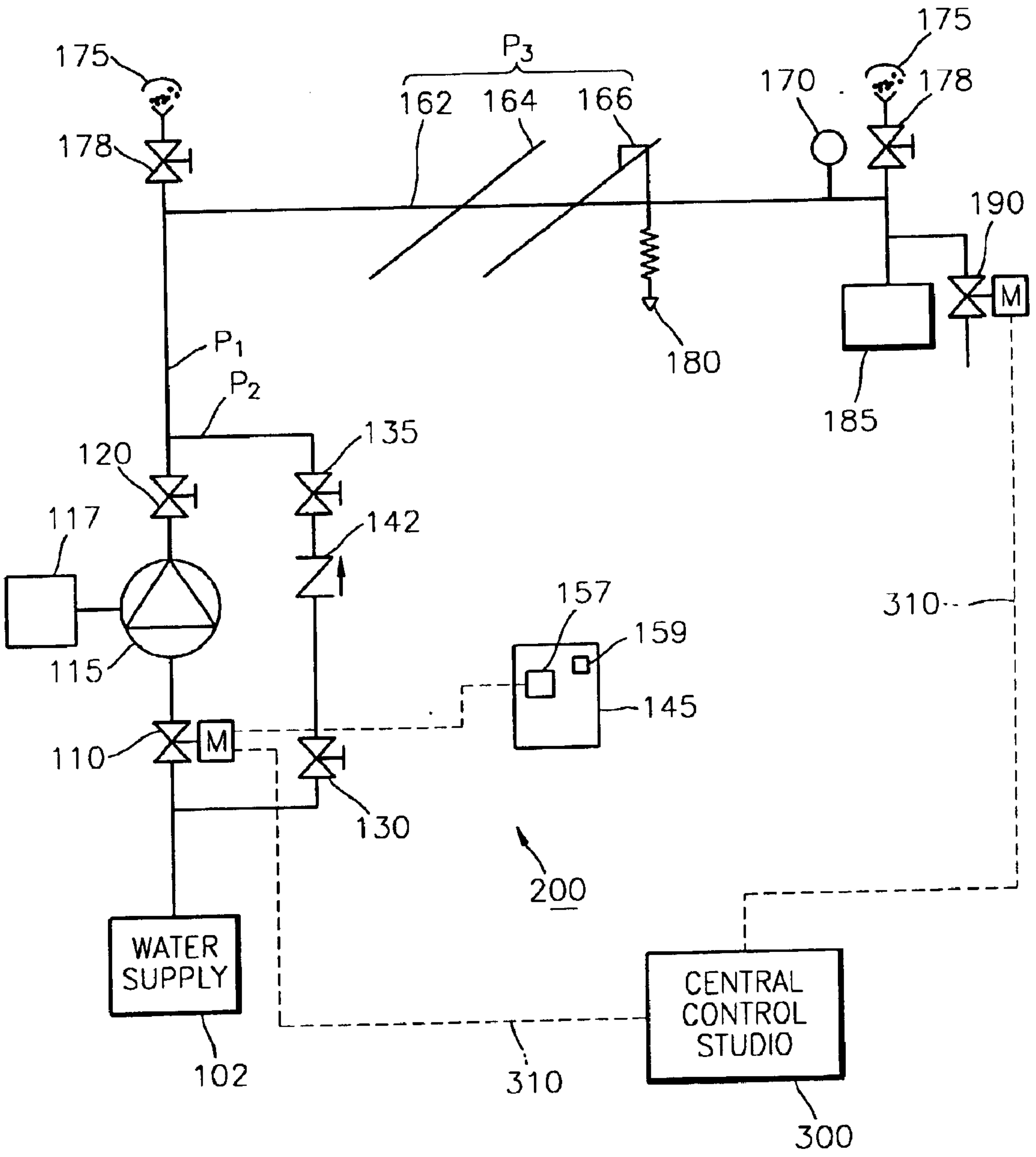
FIG. 2 illustrates a view of a wet-pipe sprinkler system according to a second embodiment of the present invention.

FIG. 2 illustrates a view of a wet-pipe sprinkler system 200 according to a second embodiment of the present invention. In FIG. 2, the same elements as those shown in the wet-pipe sprinkler system 100 of FIG. 1 are illustrated with the same reference numerals. Thus, descriptions thereof will be omitted here.

Referring to FIG. 2, in comparison with FIG. 1, an auxiliary pipe $P_3$ further includes a pressure switch 170 that measures the pressure in the auxiliary pipe $P_3$ and transmits a signal indicating whether the pressure is at a normal level. Thus, in the wet-pipe sprinkler system 200 (hereinafter, 'system'), pressure in the auxiliary pipe $P_3$ may be twice monitored by using the pressure switch 170 and by using a pressure switch included in the test connection pipe 117.

The system 200 further includes a control panel 145 having a main valve control unit 157. The main valve control unit 157 receives a signal indicating abnormal pressure in the auxiliary pipe $P_3$ from the pressure switch 170 and outputs a main valve closing signal to the electric main valve 110 to close the electric main valve 110, so that the electric main valve 110 cannot be manually opened. The main valve control unit 157 may further include means for canceling output of the main valve closing signal to the electric main valve 110 in case of an emergency. The control panel 145 further includes a state-indicative unit 159 that indicates the opening or closing of all valves installed in pipes $P_1$, $P_2$, $P_3$ and indicates a normal/abnormal pressure signal generated by the pressure switch 170. For instance, the state-indicative unit 159 may have a green light lit when these valves are in a normal state and the pressure in the auxiliary pipe $P_3$ is at a normal level, and may have a red light lit otherwise.

Figure 3:
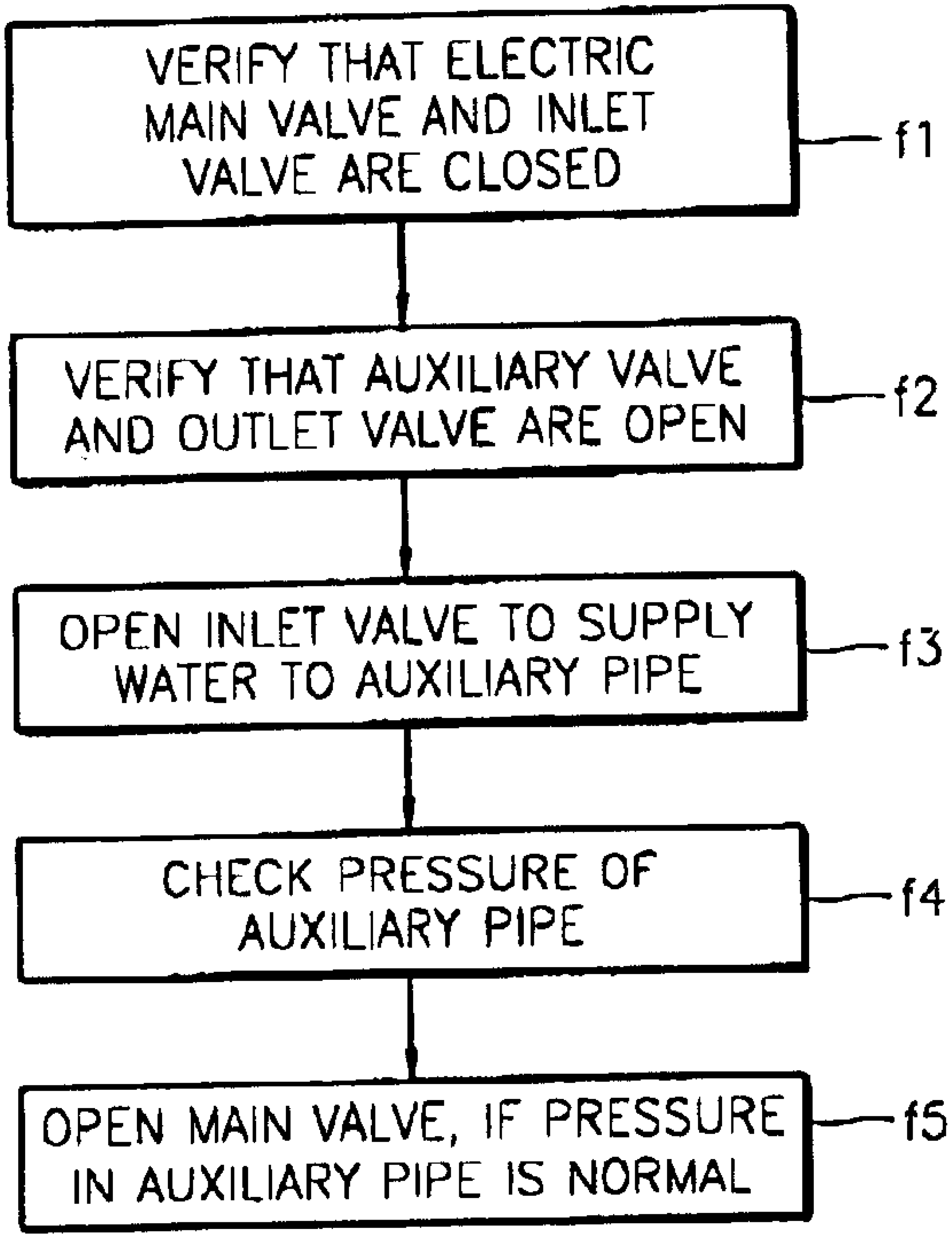
FIG. 3 is a flow chart of a method of filling the wet-pipe sprinkler system shown in FIG. 2 with water.

A method of supplying water to the system 200 of FIG. 2 will now be explained with reference to FIGS. 2 and 3.

First, a system manager or the like checks the system 200 to verify that the electric main valve 110 and inlet valve 130 are closed (step f1). Next, he or she verifies that the auxiliary valve 120 and the outlet valve 135 are open (step f2). Then, the open or closed state of the valves in the system 200 are checked using the state-indicative unit 159 included in the control panel 145.

Once the electric main valve 110 and inlet valve 130 are confirmed closed, and the auxiliary valve 120 and outlet valve 135 are confirmed open, the inlet valve 130 is opened to supply water to the system 200 (step f3). Then, the pressure in the auxiliary pipe $P_3$ is checked to see if it is at a normal level using the state-indicative unit 159 (step f4). In the event that the pressure in the auxiliary pipe $P_3$ is not at a normal level, the pipes $P_1$, $P_2$, $P_3$ are checked for leaks, a manual valve attached to the test box 185 is checked to see if it is open, and the electric drain valve 190 is checked to see if it is open. If the pressure switch 170 transmits a signal indicating that the pressure in the auxiliary pipe $P_3$ is at a normal level, the auxiliary pipe $P_3$ is completely filled with water, and thus the electric main valve 110 is opened (step f5). The electric main valve 110 may be opened manually.

The main valve control unit 157 in the control panel 145 outputs a main valve closing signal to the electric main valve 110, which closes the electric main valve 110, so that the electric main valve 110 cannot be manually opened when the pressure switch 170 transmits a signal indicating abnormal pressure in the auxiliary pipe $P_3$. Thus, in the event that a system manager mistakenly tries to manually open the electric main valve 110 prior to the complete supply of water to the auxiliary pipe $P_3$, the system manager will not be able to, because the electric main valve 110 is not able to be opened. This safeguard of ensuring that the electric main valve 110 remains closed when the pressure in the auxiliary pipe $P_3$ is abnormal helps minimize an occurrence of water hammering. However, the main valve control unit 157 includes means for canceling the output of the main valve closing signal to the electric main valve 110 in case of an emergency. Therefore, it is possible to manually open the electric main valve 110 even though the pressure in the auxiliary pipe $P_3$ is not at a normal level.

Meanwhile, the method of dealing with the leakage of the sprinkler head 180 or the pipes $P_1$, $P_2$, $P_3$ explained with reference to FIG. 3 may be applied to the system 100. Further, the method of dealing with the leakage explained with reference to FIG. 8 may also be applied to the system 200 if the controller 340 is included in the system 200 as in the modified example of the first embodiment.

In a wet-pipe sprinkler system according to embodiments of the present invention, leakage of pipes or a sprinkler head may be stopped immediately, thereby minimizing damage due to the submergence or wetting of surroundings from water leaked from the pipes or sprinkler head, unlike in a conventional wet-pipe sprinkler system in which all valves are manipulated by a system manager. Also, it is possible to supply water to pipes or a sprinkler head, suppressing the occurrence of water hammering. In addition, the pressure in an auxiliary pipe may be twice monitored.

Third Embodiment

Figure 4:
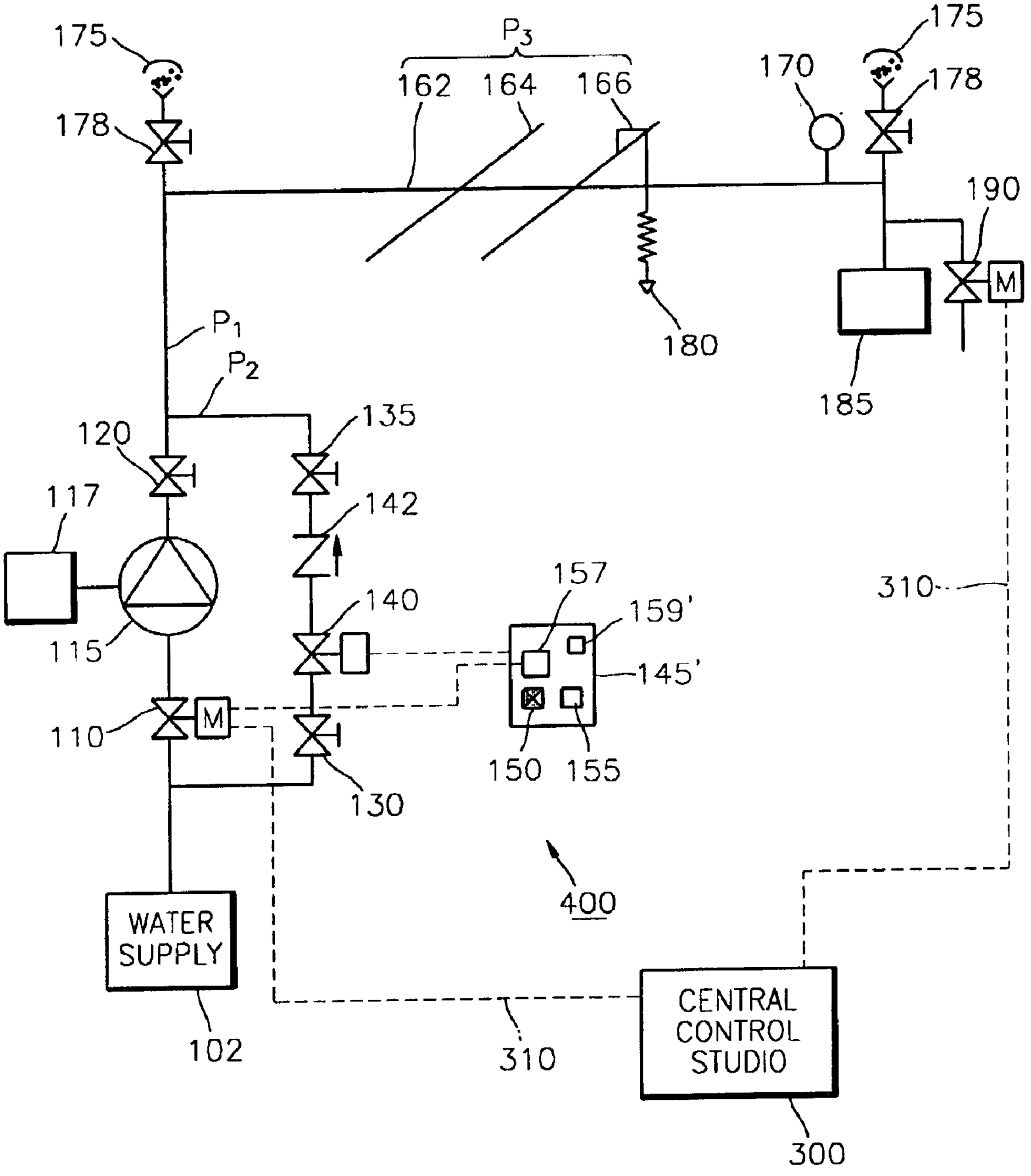
FIG. 4 illustrates a view of a wet-pipe sprinkler system according to a third embodiment of the present invention.

FIG. 4 illustrates a view of a wet-pipe sprinkler system 400 according to a third embodiment of the present invention. In FIG. 4, the same components as those shown in the wet-pipe sprinkler systems 100 and 200 according to the first and second embodiments of the present invention, respectively, are illustrated with like reference numerals. As may be seen in FIG. 4, the wet-pipe sprinkler system 400 (hereinafter, 'system') has almost the same structure as the wet-pipe sprinkler system 200. Thus, descriptions of like components will be omitted here.

Referring to FIG. 4, a water-filling pipe $P_2$ further includes an electric intermediate valve 140 between an inlet valve 130 and outlet valve 135. The electric intermediate valve 140 is a valve that is turned on and off to control the rate at which water flows.

As in the control panel 145 shown in FIG. 2, a control panel 145' includes a main valve control unit 157 that outputs a main valve closing signal to the electric main valve 110, which closes the electric main valve 110, when a pressure switch 170 receives a signal indicating an abnormal pressure in an auxiliary pipe $P_3$. Here, the main valve control unit 157 may include means for canceling the output of the main valve closing signal to the electric main valve 110 in case of an emergency. In a state-indicative unit 159' included in the control panel 145', it is possible to check whether all valves installed in pipes $P_1$, $P_2$, $P_3$ are open or closed and if a signal output from the pressure switch 170 indicates whether the pressure in the auxiliary pipe $P_3$ is at the normal level. For instance, as the state-indicative unit 159 shown in FIG. 2, the state-indicative unit 159' may have a green light lit when valves are in normal states and the auxiliary pipe $P_3$ is at a normal pressure level, and may have a red light lit otherwise.

The control panel 145' further includes a switch 150 that is manipulated to send a starting signal which opens the electric intermediate valve 140 when the pipes $P_1$, $P_2$, $P_3$and a sprinkler head 180 are supplied with water; and a timer 155 that counts a predetermined time and sends a time delay signal in response to the starting signal. The predetermined time is a time needed for supplying water to the auxiliary pipe $P_3$ and can be easily measured considering the volume of the water to be supplied to the auxiliary pipe $P_3$ in respect to the speed of the sampling water by a fire pump and the width and length of pipes. The time required for the supply of water is input to the timer 155 in advance. When the supply of water and counting of the input time are complete, the timer 155 generates a sound signal or generates a red flashing light in the state-indicative unit 159', so that a time delay signal is sent to a system manager when the time input is counted with the supply of water. The supply of water begins together with manipulation of the switch 150, and ends after a system manager receives the time delay signal, checks the pressure of the auxiliary pipe $P_3$ from the pressure switch 170, and opens the electric main valve 110 after receiving the time delay signal.

Figure 5:
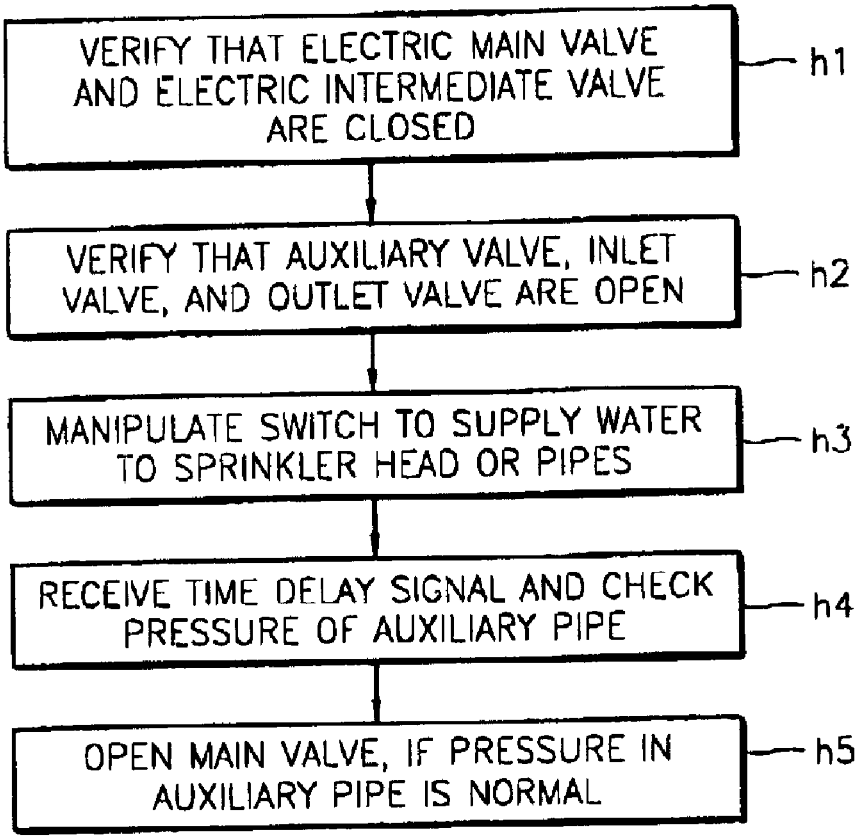
FIG. 5 is a flow chart of a method of supplying water to the wet-pipe sprinkler system of FIG. 4.

Hereinafter, a method of supplying water to the system 400 will be explained with reference to FIGS. 4 and 5.

First, a system manager verifies that the electric main valve 110 and the electric intermediate valve 140 in the system 400 are closed (step h1). Then, the system manager verifies that the auxiliary valve 120, the inlet valve 130, and the outlet valve 135 are open (step h2). The open or closed state of all valves may be checked using the state-indicative unit 159' included in the control panel 145'.

After confirming that the electric main valve 110 and the electric intermediate valve 140 are closed and that the auxiliary valve 120, inlet valve 130 and outlet valve 135 are open, the switch 150 is manipulated to open the electric intermediate valve 140, so that water is supplied to the sprinkler head 180 or the pipes $P_1$, $P_2$, $P_3$ (step h3). When a starting signal for opening the electric intermediate valve 140 is generated from the switch 150, the timer 155 receives the starting signal and transmits a time delay signal when the time input lapses. The time delay signal is transmitted as a sound or red flashing light to a system manager. The system manager, after having received the time delay signal, checks if the pressure of the auxiliary pipe $P_3$ is at a normal level by looking at the state-indicative unit 159' (step h4). If the pressure is not at a normal level, pipes $P_1$, $P_2$, $P_3$ are checked for leakage, and a manual valve in the test box 185 or the electric drain valve 190 are checked for being open, and necessary measures are taken. Alternatively, if the pressure of the auxiliary pipe $P_3$ is at a normal level, the auxiliary pipe $P_3$ has been completely supplied with water and therefore, the electric main valve 110 is opened (step h5). The electric main valve 110 may be opened manually.

The main valve control unit 157 installed in the control panel 145' outputs a main valve closing signal to the electric main valve 110 when a signal indicating that the pressure of the auxiliary pipe $P_3$ is not at a normal level, so that the electric main valve 110 is not able to be opened. Therefore, it is possible to prevent the electric main valve 110 from being mistakenly opened until the auxiliary pipe $P_3$ is completely supplied with water, thus minimizing the occurrence of water hammering. However, the main valve control unit 157 also includes means for canceling the output of the main valve closing signal to the electric main valve 110 in case of an emergency. Thus, it is possible to open the electric main valve 110 even though the pressure in the auxiliary pipe $P_3$ is not at a normal level.

The method of dealing with the leakage of a wet-pipe sprinkler system explained with reference to FIG. 6 may be used in the system 400 according to the third embodiment of the present invention. Also, if the controller 340 shown in the modified example of the first embodiment is included in the system 400, the method of dealing with the leakage of a wet-pipe sprinkler system explained with reference to FIG. 8 may also be used in the system 400.

It is possible, according to the embodiments of the present invention described above, to deal with leakage in the pipes or a sprinkler head of a sprinkler system rapidly, unlike in a conventional water-pipe sprinkler system in which all valves must be manipulated by a system manager. As a result of being able to rapidly and effectively control a leak, damage caused by submergence or wetting from the leak may be minimized.

Also, according to the present invention, it is possible to promptly deal with the leakage of pipes or a sprinkler head in a remote central control studio located at a predetermined spot, thus minimizing damage caused by submergence or wetting from the leak.

Further, a pressure switch and a control panel including a main valve control unit may be installed in a wet-pipe sprinkler system according to an embodiment of the present invention. Thus, it is possible to prevent a main valve from being mistakenly opened by a system manager when the pressure in an auxiliary pipe is not at a normal level due to an incomplete supply of water. Accordingly, a sprinkler system or pipes may be supplied with water, minimizing the occurrence of water hammering. Also, the pressure in the pipes, particularly an auxiliary pipe, may be twice monitored.

Including a switch and timer in the control panel enables a sprinkler system or pipes to be conveniently and efficiently supplied with water, thereby enhancing the work efficiency of equipment, and for a system manager.

With a sprinkler system, it is possible to save lives and property by extinguishing a fire at a beginning stage. For instance, damage may be dramatically reduced when a wet-pipe sprinkler system according to the present invention is installed in a clean room where semiconductor devices are manufactured. Also, should a sprinkler head or pipes leak in a wet-pipe sprinkler system according to the present invention, the leakage may be promptly dealt with, thereby preventing damage due to the submergence or wetting of expensive tools for manufacturing semiconductor devices.

Preferred embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A wet-pipe sprinkler systems, comprising:

a sprinkler head;

a plurality of interconnected pipes having a first end and a second end, the plurality of interconnected pipes for supplying water to the sprinkler head;

at least one water supply connected to the first end of the plurality of interconnected pipes;

an electric main valve for controlling an inflow of water from the water supply to the plurality of interconnected pipes;

an electric drain valve connected to the second end of the plurality of interconnected pipes for draining the water from the plurality of interconnected pipes;

a central control studio including a first electrical control circuit, the first electrical control circuit for outputting a drain valve opening signal to the electric drain valve, which opens the electric drain valve, and for outputting a first main valve closing signal to the electric main valve, which closes the electric main valve, thereby blocking water from entering the plurality of interconnected pipes and draining water contained in the plurality of interconnected pipes, and wherein the plurality of interconnected pipes include:

a main pipe having a first end and a second end, the first end connected directly to the at least one water supply, the main pipe including a water flow detector and an auxiliary valve;

a water-filling pipe having a first end and a second end, both of which are connected to the main pipe, the water-filling pipe including an inlet valve and an outlet valve; and an auxiliary pipe having a first end and a second end, the first end connected to the second end of the main pipe, the auxiliary pipe including the sprinkler head, wherein the electric main valve is connected to the main pipe upstream of the water flow detector, and the electric drain valve is connected to the second end of the auxiliary pipe, and the first end of the water-filling pipe is connected upstream of the electric main valve and the second end is connected downstream from the auxiliary valve.

2. The system as claimed in claim 1, further comprising:

a pressure switch for measuring a pressure in the auxiliary pipe and transmitting a signal indicating whether the pressure is at a normal level; and a control panel including a main valve control unit that outputs a second main valve closing signal to the electric main valve, which closes the electric main valve when the pressure switch transmits a signal indicating that the pressure in the auxiliary pipe is not at a normal level, so that the electric main valve is not able to be opened.

3. The system as claimed in claim 2, wherein the main valve control unit comprises means for canceling the output of the second main valve closing signal to the electric main valve.

4. The system as claimed in claim 3, wherein the control panel further comprises a state-indicative unit for indicating an open or closed state of all valves installed in the plurality of interconnected pipes, and for indicating whether the pressure of the auxiliary pipe is at a normal level based on a signal generated by the pressure switch.

5. The system as claimed in claim 3, wherein the water-filling pipe further comprises an electric intermediate valve between the inlet valve and the outlet valve, and the control panel further includes a switch that is manipulated to transmit a starting signal for opening the electric intermediate valve when the pipes or the sprinkler is supplied with water, and a timer that counts a predetermined time and transmits a time delay signal in response to the starting signal.

6. The system as claimed in claim 5, wherein the control panel further comprises a state-indicative unit for indicating an open or closed state of all valves installed in the plurality of interconnected pipes and for indicating whether the pressure in the auxiliary pipe is at a normal level based on a signal generated by the pressure switch.

7. The system as claimed in claim 1, further comprising a controller for outputting the drain valve opening signal to the electric drain valve and the first main valve closing signal to the electric main valve, the controller being disposed at a passage of a clean room, in which semiconductor devices are manufactured, when the sprinkler head is installed in the clean room.

8. A method of supplying water to the plurality of interconnected pipes in the wet-pipe sprinkler system as claimed in claim 4, the method comprising:

verifying that the electric main valve and inlet valve are closed;

verifying that the auxiliary valve and outlet valve are open;

opening the inlet valve to supply water to the auxiliary pipe;

checking the pressure in the auxiliary pipe; and opening the main valve, if the pressure in the auxiliary pipe is at a normal level.

9. A method of supplying water to the plurality of interconnected pipes in the wet-pipe sprinkler system as claimed in claim 6, the method comprising:

verifying that the electric main valve and the electric intermediate valve are closed;

verifying that the auxiliary valve, the inlet valve, and the outlet valve are closed;

manipulating the switch to open the electric intermediate valve to supply water to the auxiliary pipe;

receiving the time delay signal and checking the pressure in the auxiliary pipe; and opening the main valve, if the pressure in the auxiliary pipe is at a normal level.

10. A method of dealing with a leakage in the wet-pipe sprinkler system as claimed in claim 1, the method comprising:

detecting the leakage;

reporting the leakage to the central control studio when the leakage is detected; and outputting the drain valve opening signal to remotely open the electric drain valve and the first main valve closing signal to remotely close the electric main valve via the first electrical control circuit in the central control studio.

11. A method of dealing with a leakage in the wet-pipe sprinkler system as claimed in claim 7, the method comprising:

manipulating the controller to output the drain valve opening signal to open the electric drain valve and the first main valve closing signal to close the electric main valve when the leakage is discovered.

* * * * *